Aug. 1, 1939.  C. E. PRITZ  2,167,996
TROWEL
Filed Oct. 3, 1938  2 Sheets-Sheet 1
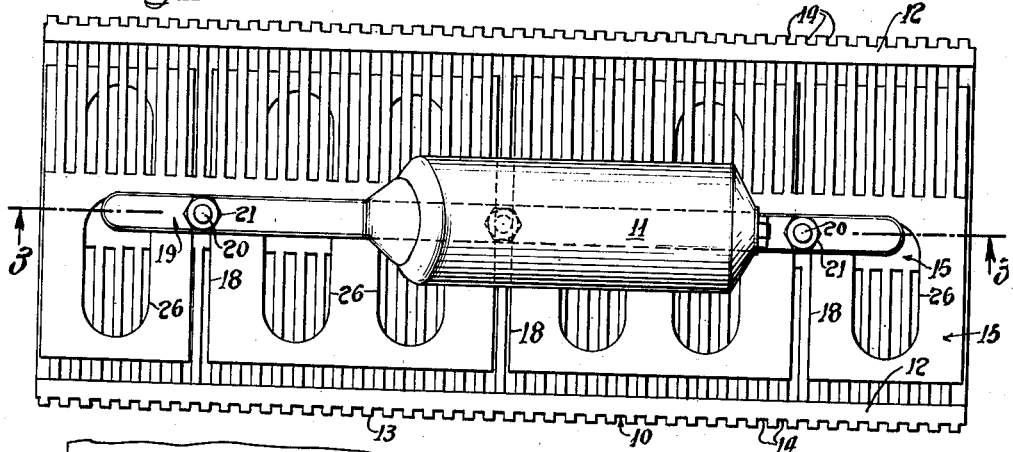
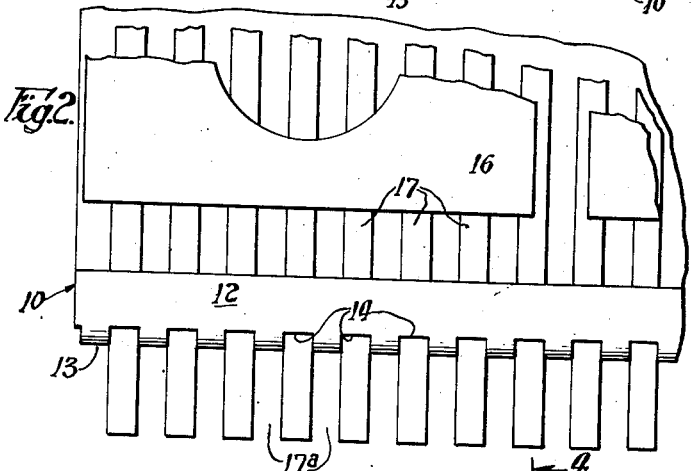
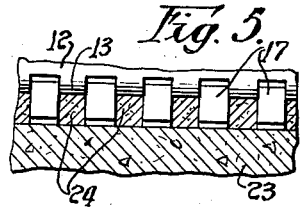
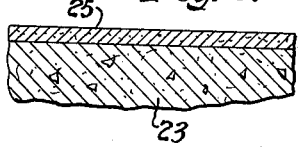
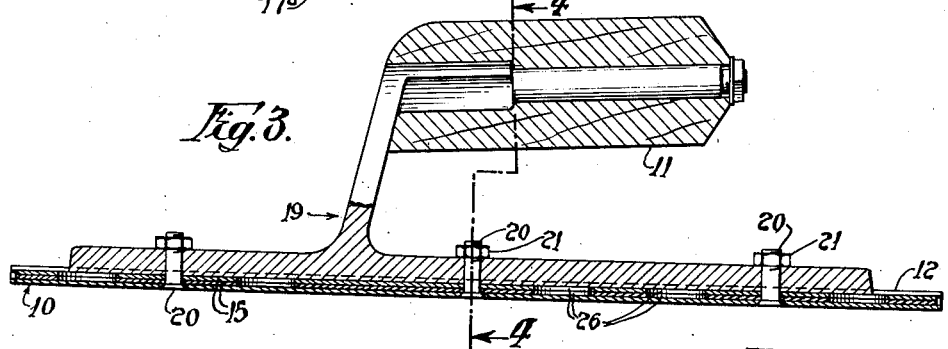
Inventor:
Clement E. Pritz,
By:
Arthur W Nelson
Attorney.

Aug. 1, 1939.                C. E. PRITZ                2,167,996
                                TROWEL
                           Filed Oct. 3, 1938         2 Sheets-Sheet 2
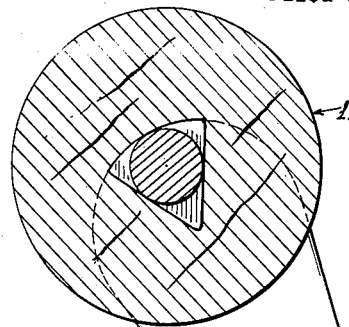
Fig. 4.
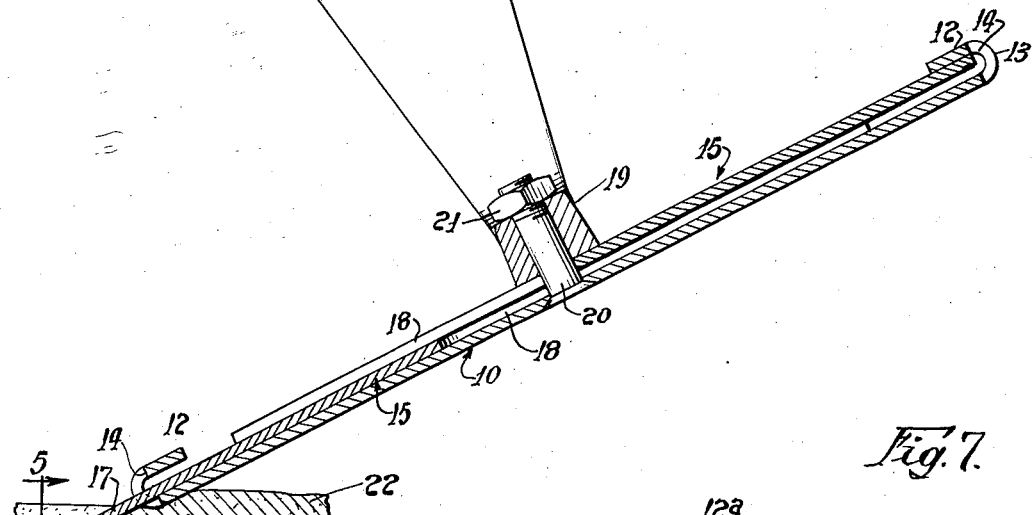
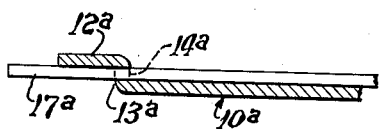
Fig. 7.
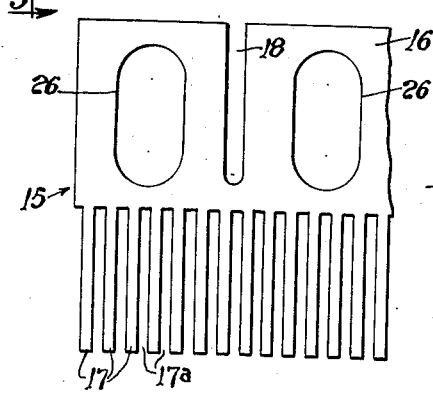
Fig. 8.
Inventor:
Clement E. Pritz,
By: Arthur W. Nelson
Attorney.

Patented Aug. 1, 1939

2,167,996

UNITED STATES PATENT OFFICE 2,167,996

TROWEL

Clement E. Pritz, Chicago, Ill.

Application October 3, 1938, Serial No. 232,946

11 Claims. (Cl. 72—136)

This invention relates to improvements in trowels and it consists of the matters hereinafter described and more particularly pointed out in the appended claims.

The invention is more particularly concerned with trowels for spreading plasters, cements and plastics upon associated surfaces as distinguished from a so-called garden trowel.

In trowels of this kind, as heretofore made, difficulty is encountered in spreading the material employed, to an even depth so that the trowelled material is not uniform in thickness and a more or less wavy surface results. In spreading plastic material upon floors to receive a sheeted covering such as linoleum, it is important that such material be of an even thickness throughout. Otherwise, not only the appearance of the finished floor covering is effected, but high spots are formed therein and which are the first places to show wear.

One of the objects of the invention is to provide a trowel for the spreading of plastic materials on desired surfaces and which not only assures an even spreading thereof but also a better control of the depth or thickness of the material thus spread.

Another object of the invention is to provide a trowel of this kind which arranges or leaves the material being spread in evenly spaced apart ridges of uniform thickness to collapse or fall and merge together in a layer of even depth.

A further object of the invention is to provide a trowel of this kind which includes spaced apart ridge forming teeth or fingers along at least one edge thereof and which teeth or fingers may be adjusted in operative length, not only to control the depth of the ridges formed, but also to compensate for the wearing off and consequent shortening in operating length.

Still another object of the invention is to provide a trowel of this kind which is not only simple in construction for low cost production, but which is also efficient in operation for its intended purpose.

The above mentioned objects of the invention as well as others, together with the several advantages thereof will more fully appear as the specification proceeds.

In the drawings:

Fig. 1 is a top plan view of a double edge trowel embodying one form of the invention, showing the spaced apart ridge forming fingers in their retracted inoperative position.

Fig. 2 is a fragmentary top plan view of a part of the trowel, shown in Fig. 1, on an enlarged scale, showing the ridge forming fingers in their projected operative position.

Fig. 3 is a longitudinal sectional view through the trowel as taken on the line 3—3 of Fig. 1.

Fig. 4 is a transverse vertical sectional view through the trowel, on a further enlarged scale, as taken on the line 4—4 of Fig. 3 and shows the trowel in the angular position of use as when spreading a plastic like material over an associated surface.

Fig. 5 is a vertical detail section through the material on the surface shown in Fig. 4, the plane of the section being taken on the line 5—5 of said Fig. 4.

Fig. 6 is a view similar to Fig. 5 after the ridged material has fallen or collapsed to merge into a layer of even depth.

Fig. 7 is a detail vertical sectional view through one side of a modified form of trowel construction embodying the invention and which will be described in greater detail, later on.

Fig. 8 is a fragmentary view in plan elevation of a plate-like member embodied in the trowel and separated from the other parts of the trowel.

Referring now in detail to that embodiment of the invention illustrated in the accompanying drawings and especially to the construction shown in Figs. 1 to 4 thereof, 10 indicates the blade of the trowel and 11 indicates the handle therefor by which the trowel as a whole is manipulated or operated in use. Said blade is in the form of a rectangular piece of sheet metal that has a length greater than its width. It has a smooth bottom working face and a top face. Along each side margin of the blade is an inturned flange 12 connected to the body of the blade by a fold 13 in which are longitudinally spaced, rectangular openings 14.

On the top face of the trowel is located a pair of comb-like plate members 15—15 each of a length approximating that of the blade, but of a width somewhat less than that of the blade. Each member 15, a part of which appears in Fig. 8, has an inner longitudinal portion 16 and an outer longitudinal portion formed of transversely extending, spaced apart fingers or teeth 17. The fingers or teeth 17 are spaced apart in accordance with the spacing between the openings 14 in the folds 13 at the longitudinal edges of the blade so as to register with and pass or extend through said openings as will later appear. Preferably the spaces 17a between said fingers, are the same in width as said fingers. In the inner portion 16 of both members 15, are transverse slots or recesses 18 that open through the edges of said portion. When said members 15—15 are in operative position upon the blade 10, the inner portion of one member overlaps the inner portion of that member directly engaged on the top face of the blade.

19 indicates a support for the handle 11 of the trowel. This support is in the form of a metal bar arranged in the longitudinal median line of the blade. Threaded studs 20 project upwardly from the blade along its median line so as to extend through the slots or recesses 18 in both members 15 and these studs also pass up through the support 19 to receive nuts 21. These studs are so anchored at their bottom ends in the blade so as to be flush therewith, as shown in Fig. 4. Thus when the nuts 21 are tightened up on the studs 20, this operates through the handle support 19 to clamp the members 15—15 in the desired position on the blade 10.

When the members 15—15 are in one operative position on the blade, the fingers or teeth 16 of both members project through the slots 14 in the folds 13 of the blade and beyond the edges of said blade as defined by said folds. When the members 15—15 are rigidly clamped in position on the blade, the flanges 12—12 overhang and extend across all of the fingers 17 at this point.

In the use of the trowel, assume that a mass of plastic material 22 has been applied to a floor 23 and that it is desired to spread said material evenly thereover to receive a floor covering such as linoleum in sheet form. With the trowel grasped by the handle, the operator causes one end portion of a set of teeth or fingers 17 to engage and penetrate the material until said teeth meet the surface of the floor 23 as appears in Fig. 4. With the transverse plane of the blade disposed in an angular position with respect to the floor, the trowel is given a sweeping movement with the said portions of the fingers trailing in the direction of the movement of the trowel. With a sufficient mass of material 22 on the floor, said material is divided into spaced ridges or bands 24 of material and those portions of the fold 23 of the blade between said fingers will act as strike off surfaces which insure an even depth of material in said ridges or bands as shown in Fig. 5.

These ridges or bands, when of a sufficient height or depth, being somewhat fluid-like, will collapse or "fall" under their own weight or when the weight of the linoleum or other material is placed thereon so as to merge or "run" together as an even layer 25 of a depth approximately half the depth of the ridges or bands mentioned.

By loosening the nuts 21 it is apparent that clamping action is released from the handle support. The members 15—15 may now be shifted inwardly or outwardly laterally of the blade, to give the desired length to the fingers or teeth, outwardly beyond the edges of the blade. This length and the angular position in which the trowel is held, determines the depth of the ridges 24 of material formed.

The recesses or notches 18 in the inner portion of the plate members 15—15 are so gauged in length that when the inner ends engage the studs 20 the outer extremities of the fingers 17 are disposed just within the folds 13 defining the lateral edges of said blade. If desired to reduce the weight of the members 15—15 without impairing their rigidity, openings 26 may be made in the inner portions 16 of said members at points between said recesses or slots 18.

In Fig. 1, the plates are shown with the teeth entirely within the confines of the blade but in use the teeth will ordinarily project from the edge. Also, while in Fig. 4 only one plate is shown as projecting, usually both plates will be arranged so that they project when the device is in use.

In Fig. 7 I have shown a modified form of construction of a trowel embodying the invention, which relates more particularly to the structure at the edges of the blade. Instead of the flanges 12—12 which are folded back upon the blade to provide a backing for the fingers against flexing as before described, I provide the following. 10a indicates the blade which is formed with a marginal, outwardly extending, flange-like edge portion 12a that is upset upwardly above the top face of the blade but is joined thereto by a reverse curve portion or web 13a in which are formed the longitudinally spaced openings 14a through which the fingers or the teeth 17a extend. With this arrangement, the fingers or teeth extend under this flange-like edge portion to receive a backing against flexing at a point outwardly beyond the edge of the blade proper. Also, with such an arrangement, it is apparent that the bottom edge of the portion 12a then operates as the strike-off for the ridges of plastic material operated upon, in the use of the trowel.

While the fingers or teeth are shown as being rectangular in shape, they may be of other desired shapes.

While in describing the invention I have referred in detail to the form, arrangement and construction of the parts involved, the same is to be considered only in the illustrative sense so that I do not wish to be limited thereto except as may be specifically set forth in the appended claims.

I claim as my invention:

1. A trowel embodying therein a blade having a bottom working face and a top face, means on said top face of the blade providing spaced apart fingers projecting outwardly beyond one edge of the blade, and means carried by said blade along said edge for engaging said fingers from above.

2. A trowel embodying therein a blade having a bottom working face and a top face, means mounted on said top face of the blade for movement toward and away from one edge of said blade and formed to provide spaced apart fingers projecting outwardly beyond said edge of the blade, parts of said blade along said edge being formed to extend between said fingers to guide said fingers in the adjusting movement of said first mentioned means.

3. A trowel embodying therein a blade having a bottom working face and a top face, means mounted on said top face of the blade for movement toward and away from one edge of said blade and formed to provide spaced apart fingers projecting outwardly beyond said edge of the blade, parts of said blade along said edge being formed to extend between said fingers and to engage the same from above to guide said fingers in the adjusting movement of said first mentioned means and to resist flexing of said fingers at points inwardly of said edge.

4. A trowel embodying therein a blade having a bottom working face and a top face and opposed edges, means on said top face of the blade each mounted for movement toward and away from an associated edge and formed to provide spaced apart fingers extending outwardly beyond said edges, and means along said edges and including portions arranged between said fingers for guiding said fingers in the movement of said means toward and away from said edges.

5. A trowel embodying therein a blade having a bottom working face and a top face and opposed edges, means on said top face of the blade each mounted for movement toward and away from an associated edge and formed to provide spaced apart fingers extending outwardly beyond said edges, and means along said edges and including portions arranged between said fingers and other portions for engaging said fingers from above for guiding said fingers in the movement of said means toward and away from said edges and for resisting flexing of said fingers at points inwardly of said edges.

6. A trowel embodying therein a blade having a bottom working face and a top face, a part of said blade having a folded over flange along one edge with longitudinally spaced openings through the fold, means mounted on the top face of the blade for movement toward and away from said edge and including spaced apart fingers projecting through said openings and outwardly beyond said edge, and means carried by said blade for holding said means against movement thereon.

7. A trowel embodying therein a blade having a bottom working face and a top face, a handle support associated with said top face, a member mounted on said top face and beneath said handle support for movement toward and away from one edge of the blade and formed with longitudinally spaced fingers adapted to extend outwardly beyond said edge, and means for securing said handle support to the blade and being operable to cause said handle support to clamp said member to said blade.

8. A trowel embodying therein a blade having a bottom working face and a top face, a handle support associated with said top face, a member mounted on said top face and beneath said handle support for movement toward and away from one edge of the blade and formed with longitudinally spaced fingers adapted to extend outwardly beyond said edge, parts of said blade along said edge being formed to extend upwardly between said fingers and operating as guides therefor, and means for securing said handle support to the blade and being operable to cause said handle support to clamp said member to the blade.

9. A trowel embodying therein a blade having a bottom working face and a top face, a handle support associated with said top face, a member mounted on said top face and beneath said handle support for movement toward and away from one edge of the blade and formed with longitudinally spaced fingers adapted to extend outwardly beyond said edge, parts of said blade along said edge extending upwardly between said fingers to act as guides therefor, and means for operatively securing the handle support to said blade and passing through openings in said member, said last mentioned means operating through the handle support to clamp the said member in position upon the blade.

10. A trowel embodying therein a blade having a bottom working face and a top face, said blade being formed along opposed edges with a flange that overhangs marginal parts of the top face and is connected to said blade by a fold in which are longitudinally spaced openings, a handle support associated with said top face, a pair of plate like members mounted on said top face for movement, each toward and away from an associated edge of the blade, the inner portions of said plate-like members being arranged in overlapping relation beneath said handle support and formed along their outer portions as longitudinally spaced fingers which extend through and beyond said openings in said folds and whereby said fingers are engaged from above by said flanges, and means for securing said handle support to said blade and passing through openings in the overlapping inner portions of said members, said last mentioned means operating through said handle support to clamp said members to the blade.

11. A blade for a trowel, said blade having a working face and a top face, opposed marginal parts of said blade being spaced above said top face and connected to the body of the blade by means of portions having longitudinally spaced openings therein.

CLEMENT E. PRITZ.